April 27, 1954     S. SHALER     2,676,402
SINGLE-ACTION PINKING SHEARS
Original Filed March 16, 1950
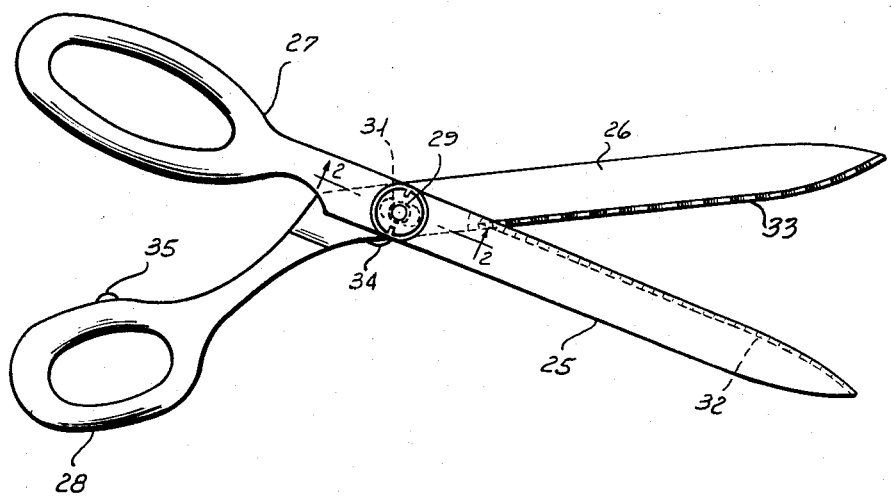
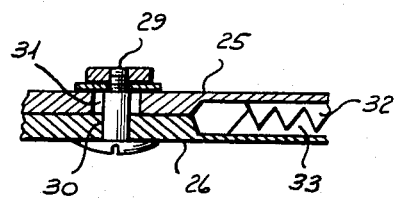
INVENTOR.
SAUL SHALER
BY Cornelius Zabriskie
ATTORNEY

Patented Apr. 27, 1954

2,676,402

UNITED STATES PATENT OFFICE 2,676,402

SINGLE-ACTION PINKING SHEARS

Saul Shaler, Jackson Heights, N. Y.

Original application March 16, 1950, Serial No. 149,921. Divided and this application August 18, 1952, Serial No. 304,936

1 Claim. (Cl. 30—230)

This invention relates to pinking shears, the present application being a division of parent application Serial No. 149,921, filed March 16, 1950.

In the parent application two types of shears are disclosed; one wherein the blades are operable by compound action and the other wherein the blades are single action. The present divisional application is directed to the latter type, having serrated blades adapted to cut by interfitting articulation of the teeth thus formed. In order to so operate, prior practice has required that the cutting teeth of the two blades be machined and lapped with great exactness to conform with one another in succession. This is such an expensive procedure that only high priced shears could be expected to cut properly.

The present invention provides a single action shears which may be made by conventional quantity production methods, which do not require expensive lapping operations and the blades of which do not have to be selectively matched or mated, yet the resulting product will cleanly pink the most delicate fabrics without fraying or pulling of threads.

This result is accomplished by so mounting the blades that the teeth of the respective blades are at all times in mesh and by so arranging the fulcrum pivot of the blades that said blades are at all times freely longitudinally movable relative to one another. With this arrangement, the cooperating teeth of the two blades are free to individually "find" the best interfitting relation between themselves and are thus automatically self-centering as the blades of the shears are opened and closed. This is so even though the size and spacing of successive teeth of either or both blades may not be truly uniform.

Features of the invention, other than those adverted to, will be apparent from the hereinafter detailed description and appended claim when read in conjunction with the accompanying drawing.

The accompanying drawing illustrates one practical embodiment of the invention, but the construction therein shown is to be understood as illustrative, only, and not as defining the limits of the invention.

Figure 1 is a face view of single action shears embodying the present invention.

Figure 2 is a fragmental section on the line 2—2 of Figure 1 with the blades fully closed.

The drawing shows the shears as having two blades 25 and 26 forming parts of levers having relatively rigid handles 27 and 28 and pivoted to one another by a fulcrum pivot 29. This pivot is illustrated as a bolt, although any other suitable fulcrum pivot may be used.

The fulcrum bolt 29, preferably a shouldered bolt, is shown best in Figure 2 as passing snugly through a circular hole 30 in the blade 26 and extending through an elongated slot 31 in the other blade 25. The blades are thus connected for pivotal movement while permitting relative longitudinal movement. The teeth of the serrated edges of the cutting flanges 32 and 33 are at all times in mesh, a stop 34 on the blade 26 serving to limit opening movement of the blades and stop 35 on the handle 28 serving to limit their closing movement.

Such being the case, the relative position of the two blades with respect to one another is controlled at all times by the interfitting relation of the particular teeth of the two blades which are at any particular time in mesh. In other words, when any particular tooth of one blade is brought into mesh with the correesponding space between teeth of the other blade, that tooth will automatically center itself in said space and autogenously shift one of the blades relative to the other sufficiently to permit this self-centering action to take place. As a consequence of this fact, either or both the shaping or spacing of the consecutive teeth of the two blades may be somewhat inaccurate and yet the self-centering of these teeth, as they cooperate with one another, will automatically compensate for such inaccuracy and permit said teeth to efficiently cut the material between them.

It will thus be manifest that by the simple expedient of mounting the two blades for relative longitudinal movement, the self-centering of the cutting teeth will automatically result and thus enable the corresponding individual teeth throughout the length of the two blades to effectually cut, notwithstanding lack of uniformity between consecutive teeth of either or both blades or slight misplacement of the fulcrum pivot of the shears. Consequently, the manufacture of such shears does not require close tolerances in order to obtain outstanding performance in operation.

In accordance with this invention it is essential that at least one of the blades be mounted for movement so that the blades are capable of autogenous relative longitudinal movement, as they are opened and closed, to permit of the self-centering of the cutting teeth as described. If the blades were locked against such relative longitudinal movement, the self-centering feature of this invention could not be present. For example, if the blades were fulcrumed by a normally rigid eccentric pivotal connection which required manual adjustment to produce the optimum normally fixed longitudinal relation between the blades, as has been hitherto suggested, the relation of the teeth of the two blades would be fixed and predetermined during operation of the blades and said teeth would be incapable of the self-centering permitted when the blades are free to shift as required by the peculiarities of the individual teeth.

It will be apparent from the foregoing detailed description that, by mounting the two cutting blades of the shears for relative longitudinal movement and utilizing cooperating cutting teeth of the two blades to automatically relatively adjust the blades to effect self-centering of these teeth, I am able to accomplish cutting accuracy which could not possibly be obtained by either optimum manual adjustment of or fixed relation between the blades and this result is possible with ordinary production methods where tolerances are not always too close. I wish it understood, however, that the present invention may be incorporated to advantage even in high price shears made to close tolerances and lapped, for the incorporation of the invention in any shears, wherein the cutting teeth do not leave mesh with one another, will materially add to the cutting efficiency of the shears.

The foregoing detailed description sets forth the invention in its preferred practical form, but the invention is to be understood as fully commensurate with the appended claim.

Having thus fully described the invention, what I claim as new and desire to secure by Letters Patent is:

Single action shears comprising: blades having cutting teeth at all times in mesh and pivoted to one another by a fulcrum pivot in fixed position longitudinally of one blade and passing through a longitudinal slot in the other blade, said blades being free for unrestricted relative longitudinal movement in both directions induced by the autogenous self-centering of the teeth of the respective blades as such teeth progressively mesh with one another during pivotal movement of the blades.

References Cited in the file of this patent

UNITED STATES PATENTS

| Number | Name | Date |
| --- | --- | --- |
| 467,808 | Heinrichs | Jan. 26, 1892 |
| 764,878 | Beebe | Nov. 2, 1903 |
| 846,854 | Jones | Mar. 12, 1907 |
| 906,255 | Melander | Dec. 8, 1908 |
| 1,964,676 | Schmitz | June 26, 1934 |
| 2,050,870 | Weidauer | Aug. 11, 1936 |
| 2,290,303 | Nikonow et al. | July 21, 1942 |
| 2,491,712 | Campbell | Dec. 20, 1949 |
| 2,590,024 | Lieberman | Mar. 18, 1952 |